United States Patent
Nagao

(10) Patent No.: US 10,965,835 B2
(45) Date of Patent: Mar. 30, 2021

(54) IMAGE FORMING APPARATUS CAPABLE OF GENERATING CORRECTION DATA FOR CORRECTING IMAGE DENSITY BY INSURING THE USER USES THE NEWLY PRINTED TEST ORIGINAL

(71) Applicant: CANON KABUSHIKI KAISHA, Tokyo (JP)

(72) Inventor: Daisuke Nagao, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/839,400

(22) Filed: Apr. 3, 2020

(65) Prior Publication Data

US 2020/0336606 A1   Oct. 22, 2020

(30) Foreign Application Priority Data

Apr. 19, 2019   (JP) .............................. JP2019-080252

(51) Int. Cl.
*H04N 1/40* (2006.01)
*H04N 1/401* (2006.01)
*H04N 1/00* (2006.01)

(52) U.S. Cl.
CPC ......... *H04N 1/401* (2013.01); *H04N 1/00045* (2013.01); *H04N 1/00501* (2013.01); *H04N 1/00005* (2013.01); *H04N 1/00411* (2013.01); *H04N 1/40068* (2013.01)

(58) Field of Classification Search
CPC combination set(s) only.
See application file for complete search history.

(56) References Cited

U.S. PATENT DOCUMENTS

| 8,610,982 B2 * | 12/2013 | Tsunoda ............... H04N 1/6033 |
| | | 358/518 |
| 10,637,998 B2 * | 4/2020 | Arakane ............ H04N 1/00082 |
| 2001/0026372 A1 | 10/2001 | Misawa | |

* cited by examiner

*Primary Examiner* — Barbara D Reinier
(74) *Attorney, Agent, or Firm* — Venable LLP

(57) ABSTRACT

An image forming apparatus can prevent generation of correction data without setting a proper test original. A mat is closed for pressing an original on a platen. An opening/closing sensor detects a closed state and an open state of the mat. A density correction section corrects image data based on a correction condition. A printer forms an image based on the image data. A CPU controls the printer to form a pattern on a sheet, controls a CCD sensor to acquire read data concerning an image of the original according to user instruction for the CCD sensor to read the original, and generates the correction condition based on the read data. When the user instruction is given, if the open state of the mat is not changed to the closed state, the CPU displays a screen prompting the user to place the sheet on the platen.

5 Claims, 10 Drawing Sheets

IMAGE FORMING APPARATUS CAPABLE OF GENERATING CORRECTION DATA FOR CORRECTING IMAGE DENSITY BY INSURING THE USER USES THE NEWLY PRINTED TEST ORIGINAL

BACKGROUND OF THE INVENTION

Field of the Invention

The present invention relates to an image forming apparatus that generates correction data for correcting image density when image data generated by reading an original is output.

Description of the Related Art

In an image forming apparatus, such as a copy machine, a printer, a facsimile machine, or a multifunction peripheral (hereinafter referred to as the MFP) having the functions of these, the density characteristics of output images sometimes become unstable depending on factors including an environment where the image forming apparatus is used and frequency of use of the apparatus.

For example, the operation of an image forming apparatus using an electrophotographic method is liable to be affected by the ambient temperature and humidity of the apparatus or aging of components thereof, in steps of an electrophotographic process, such as laser exposure, latent image formation on a photosensitive member, image development with toner, toner transfer onto a paper medium, and thermal fixation of the image. Therefore, the amount of toner finally fixed on the paper medium changes each time, which causes a change in the density of the output image. It is known that such instability of the density characteristics of an output image, due to an environment (temperature and humidity), frequency of use of the apparatus, etc., is not specific to the electrophotographic method, but this instability is also caused in an inkjet recording method, a thermal transfer method, and other various methods. As a conventional technique for improving the instability of the density characteristics, there has been proposed a method of generating a density correction table according to a change in the density characteristics of an output image and correcting image data using the density correction table to thereby correct output image density.

In the following, an image data correction method will be described with reference to FIGS. 8 and 9. FIG. 8 is a view of density characteristics of an output unit of the image forming apparatus. In FIG. 8, the vertical axis represents an output density, with a value of 0 corresponding to white and a value of 255 corresponding to black. The horizontal axis represents an input data value input to the output unit of the image forming apparatus, with a value of 0 corresponding to white and a value of 255 corresponding to black. A broken straight line 800 represents ideal linear density characteristics of the output unit. More specifically, the straight broken line 800 indicates that in a case where density values of input data are linear, the density values of an image formed by printing out the input data are also linear. However, due to the influences of an environment and use frequency of the output unit, the density characteristics of the output image can be changed, as indicated by curves 801, 802, and 803. Therefore, to make linear the density characteristics of an output image, it is required to correct density data by the density correction table (correction data).

FIG. 9 is a diagram showing an example of a density correction table for correcting the linearity of density characteristics of an output image. In FIG. 9, the vertical axis and the horizontal axis are the same as those in FIG. 8. A curve 901 represents data for correcting the density characteristics represented by the curve 801. The curve 801 and the curve 901 have respective shapes symmetrical with respect to the ideal straight line 800. Similarly, curves 902 and 903 represent data for correcting the density characteristics represented by the curves 802 and 803, respectively. The density correction table is generated by tabulating values represented by the above curves 901, 902 and 903. By using this density correction table, it is possible to realize the linearity of the density characteristics of an output image.

As a method of calculation of the density characteristics of an output image, described above with reference to FIG. 8, there has been disclosed one which employs a test original generated by a pattern generator. Hereinafter, this method will be described with reference to FIG. 10.

FIG. 10 is a diagram showing an example of a test original on which a density gradation pattern is printed. First, the image forming apparatus outputs the test original denoted by PG. In general, the test original PG is generated by printing a density gradation pattern of a plurality of toner images on a sheet. For example, a density gradation pattern 1001 formed by a pattern of N toner images is printed on a sheet surface of the test original PG. In the density gradation pattern 1001, a toner image 1002 has a highest density and the density becomes lower in the order of a toner image 1003, a toner image 1004, et seq., up to an N-th toner image which has a lowest density. The image forming apparatus can obtain luminance data with N gradations by reading the test original PG on which the density gradation pattern 1001 with N gradations is printed. Next, the image forming apparatus converts the obtained luminance data to density data by luminance-density conversion (logarithmic conversion). The density data thus obtained indicates the density characteristics of an output image by the output unit which has output the test original PG. Therefore, it is only required to generate a density correction table which makes linear the density characteristics thus acquired.

To generate a proper correction table, it is necessary to place the output test original with a proper orientation on an original placing unit. US Patent Application Publication No. 2001/026372 has proposed a method of arranging a plurality of gradation patterns point-symmetrical with respect to a center position of an output image, in a test original, thereby making it possible to generate a correction table in which a density difference caused by a difference in output positions of the image output by the image forming apparatus is taken into account. This makes it possible to generate the same correction table from whichever direction the test original is read by the image forming apparatus.

However, there is a case where reading for generating a density correction table is performed in a state in which an output test original is not placed on the original placing unit e.g. due to a user's erroneous operation. For example, after a test original has been output, when the user instructs to start reading of the test original in a state in which the user has forgotten to place the test original on the original placing unit, it is impossible to obtain proper read data, so that in this case, it is impossible to generate proper correction data.

Further, to generate density correction tables e.g. for respective resolutions of 600 dpi and 1200 dpi, it is necessary to perform the following procedure: First, the image forming apparatus outputs a test original for a resolution of 600 dpi, and the user places the test original on the original placing unit, whereafter the image forming apparatus reads the test original, to thereby generate a density correction table for the resolution of 600 dpi. Then, the image forming apparatus outputs a test original for a resolution of 1200 dpi, and the user places the test original on the original placing unit, whereafter the image forming apparatus reads the test original, to thereby generate a density correction table for the resolution of 1200 dpi. In doing this, if the user forgets to set the test original for the resolution of 1200 dpi, the test original for 600 dpi set before is read. This brings about a problem that the density correction table for the resolution of 1200 dpi is generated based on the read data of the test original for the resolution of 600 dpi.

SUMMARY OF THE INVENTION

The present invention provides an image forming apparatus that prevents correction data from being generated in a state in which a proper test original is not set.

The present invention provides an image forming apparatus comprising a platen on which an original is placed, a pressure plate for pressing the original on the platen against the platen, the pressure plate being capable of being opened and closed with respect to the platen, a reading sensor configured to read the original placed on the platen, an operation panel to which is input user instruction information for instructing the reading of the original by the reading sensor, the operation panel including a display, a detector configured to detect a first state in which the pressure plate is closed and a second state in which the pressure plate is not closed, a correction unit configured to perform correction processing on image data based on a correction condition, an image forming unit configured to form an image based on the image data on which the correction processing has been performed, and a controller configured to control the image forming unit so as to form a pattern on a sheet, control the reading sensor based on the user instruction information, so as to acquire read data concerning the pattern, and generate the correction condition based on the read data, wherein in a case where the user instruction information is input, unless a detection result of the detector is changed from the second state to the first state after the pattern has been formed on the sheet, the controller controls the display so as to display a screen for prompting a user to place the sheet having the pattern formed thereon.

According to the present invention, it is possible to prevent correction data from being generated in a state in which a proper test original is not set.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
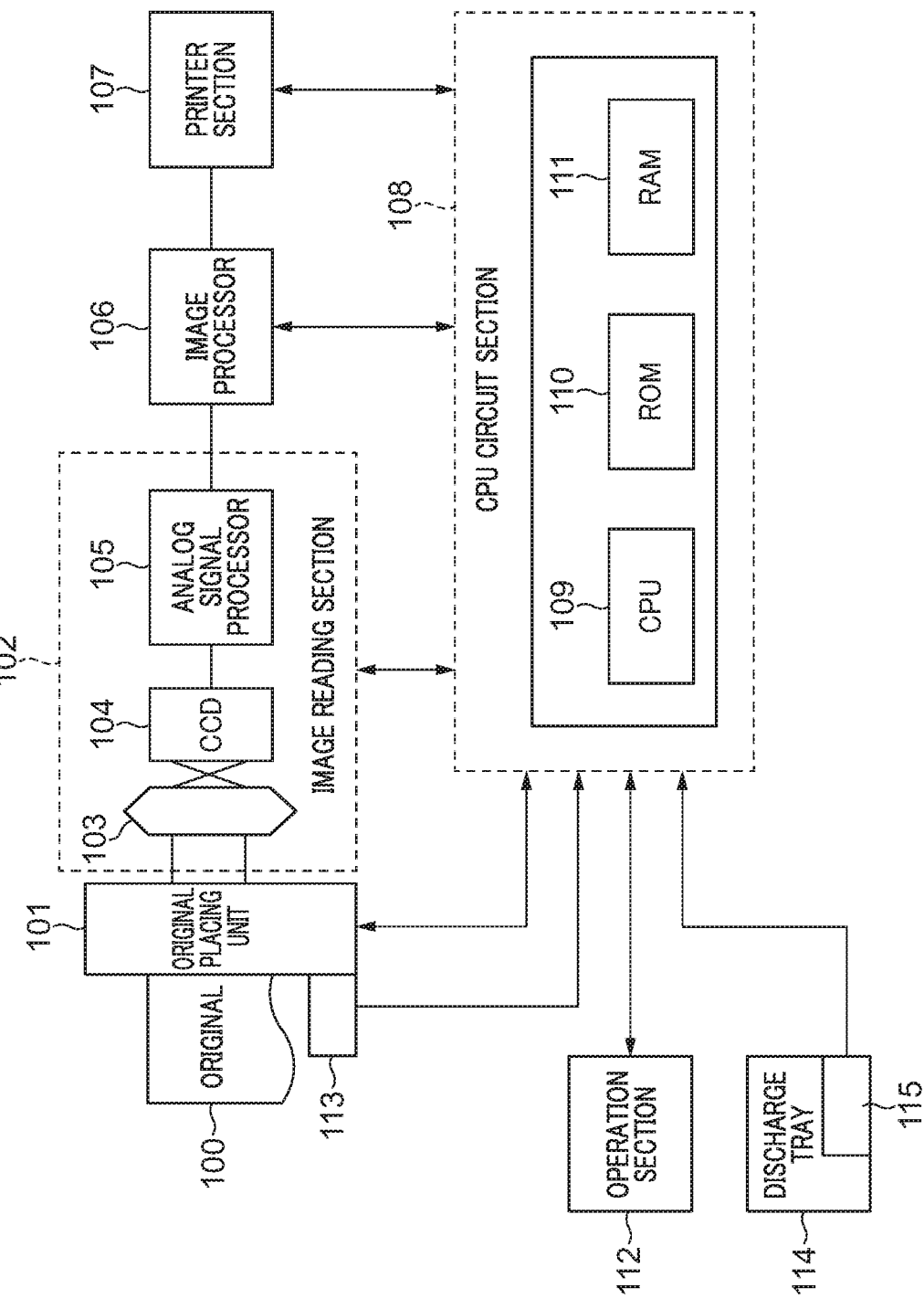
FIG. 1 is a block diagram of essential components of an image forming apparatus.

FIG. 1 is a block diagram of essential components of an image forming apparatus according to an embodiment of the present invention. This image forming apparatus is configured as a monochrome multifunction peripheral (hereinafter referred to as the MFP) 1000 using an electrophotographic method, by way of example.

Figure 10:
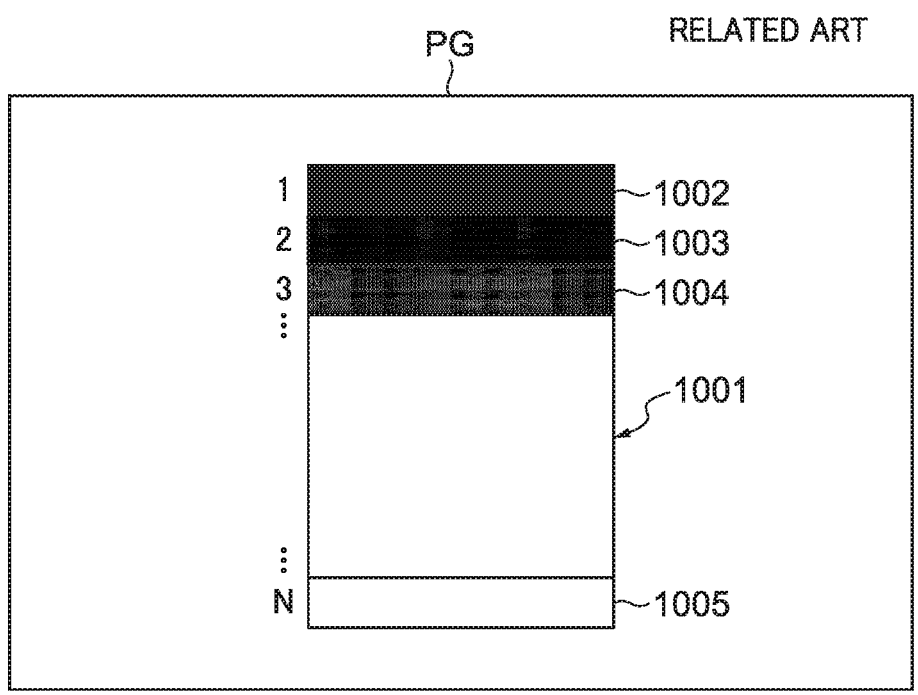
FIG. 10 is a diagram showing an example of a test original.

The MFP 1000 is comprised of an original placing unit 101, an image reading section 102, an image processor 106, a printer section 107, a CPU circuit section 108, and a discharge tray 114. The original placing unit 101 is a table (platen) for placing an original 100 thereon, and details thereof will be described hereinafter with reference to FIG. 2. The original 100 is a print medium, such as a sheet, to be read. As described above with reference to FIG. 10, or as described hereinafter with reference to FIG. 5A, in some cases, the original 100 is a test original PG having a density gradation pattern printed thereon. The image reading section 102 includes a lens 103, a CCD sensor 104, and an analog signal processor 105. The lens 103 collects light reflected from the original 100 placed on the original placing unit 101. The CCD sensor 104 converts an optical image of an original formed thereon through the lens 103 to analog electrical signals. The analog signal processor 105 samples and holds the converted analog electrical signals input thereto, and after performing dark level correction etc., thereon, performs analog-to-digital conversion (A/D conversion) on the analog electrical signals to output a digital image signal.

The digital image signal output as described above is input to the image processor 106. The image processor 106 performs correction processing, such as shading correction, required to be performed by a reading system, smoothing processing, edge emphasis processing, binarization processing, other types of processing, manipulation, etc. Image data processed by the image processor 106 is input to the printer section 107. The printer section 107 is a printer device, such as a laser beam printer or an LED printer. During a copy operation, the printer section 107 serves as an image forming unit which forms an image based on image data generated by the image reading section 102 including the CCD sensor 104 as a reading sensor. In a case where the MFP 1000 is configured as the laser beam printer, the printer section 107 is comprised of an exposure controller including a semiconductor laser, an image forming section, a conveyance controller for conveying sheets (transfer sheets), and so forth (none of which are shown). The MFP 1000 records images on the sheets based on input image signals.

The CPU circuit section 108 includes a CPU 109, a ROM 110, and a RAM 111. The ROM 110 stores control programs executed by the CPU 109, test image data values for outputting the test original PG, and various other types of data. The RAM 111 is used as a work area during processing by the CPU 109, and temporarily stores various types of data and values of a density correction table generated by reading the test original PG.

An operation section 112 is an operation panel that includes a touch-panel type display section, and is configured to display characters on the display section and receive an instruction operation performed by a user. Information set by the user via the operation section 112 is transmitted to the image reading section 102, the image processor 106, the printer section 107 or the like via the CPU circuit section 108.

A sheet having an image formed thereon is discharged onto the discharge tray 114. The discharge tray 114 is provided with a sheet presence detection sensor 115 for detecting whether any sheet is present on the discharge tray 114. The sheet presence detection sensor 115 is formed e.g. by a physical switch. In a case where there is any sheet on the discharge tray 114, the sheet presence detection sensor 115 delivers a signal to the CPU circuit section 108. With this, the CPU circuit section 108 can acquire information on sheet presence on the discharge tray 114. A size sensor 113 detects the size of the original 100 placed on the original placing unit 101 and transmits information of the size of the original 100 to the CPU circuit section 108. The size sensor 113 is formed by e.g. a plurality of optical sensors. Note that the configurations of the sheet presence detection sensor 115 and the size sensor 113 are not particularly limited.

The CPU circuit section 108 controls the image reading section 102, the image processor 106, the printer section 107, and the operation section 112, etc., and performs centralized control of the control sequence of the MFP 1000. Further, the CPU circuit section 108 also performs a density correction table generation process, described hereinafter with reference to FIG. 6, and also monitors an opening/closing sensor 202 (FIG. 2), the sheet presence detection sensor 115, and the size sensor 113.

Figure 2:
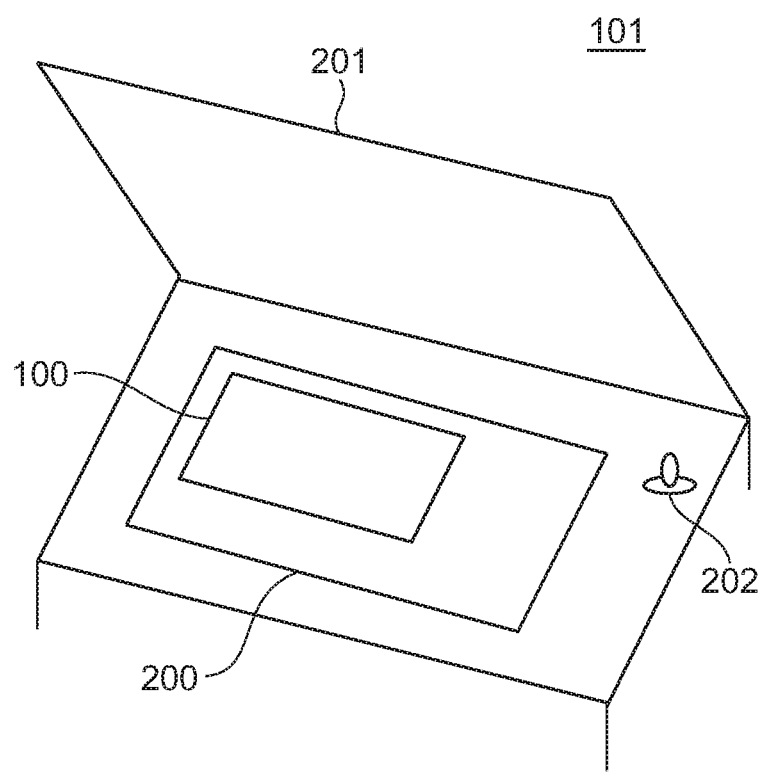
FIG. 2 is a schematic perspective view of an original placing unit.

FIG. 2 is a schematic perspective view of the original placing unit 101. A placement surface 200 of the original placing unit 101 is formed by a transparent plate, such as a glass plate. The original 100 is placed on the placement surface 200. An original mat 201 (pressure plate) is disposed on the placement surface 200 such that it can be opened and closed. In general, the user closes the original mat 201 after placing an original 100 to be read on the placement surface 200. The opening/closing sensor 202 is disposed in the vicinity of one side of the placement surface 200. The opening/closing sensor 202 is a switch-type sensor and is configured to be turned on or off by opening or closing of the original mat 201. That is, when the original mat 201 is closed, the opening/closing sensor 202 is pressed and turned on to output an ON signal. When the original mat 201 is opened, the opening/closing sensor 202 is turned off to stop outputting the ON signal. The on/off state of the opening/closing sensor 202 is monitored by the CPU 109 and is stored in the RAM 111. The opening/closing sensor 202 corresponds to a detector in the present invention, which detects that the original mat 201 is changed from the open state to the closed state. Note that the opening/closing sensor 202 is only required to have a function of detecting the open/closed state of the original mat 201. The configuration of the opening/closing sensor 202 is not limited to the illustrated example, but the opening/closing sensor 202 may be an optical sensor, for example.

Figure 3:
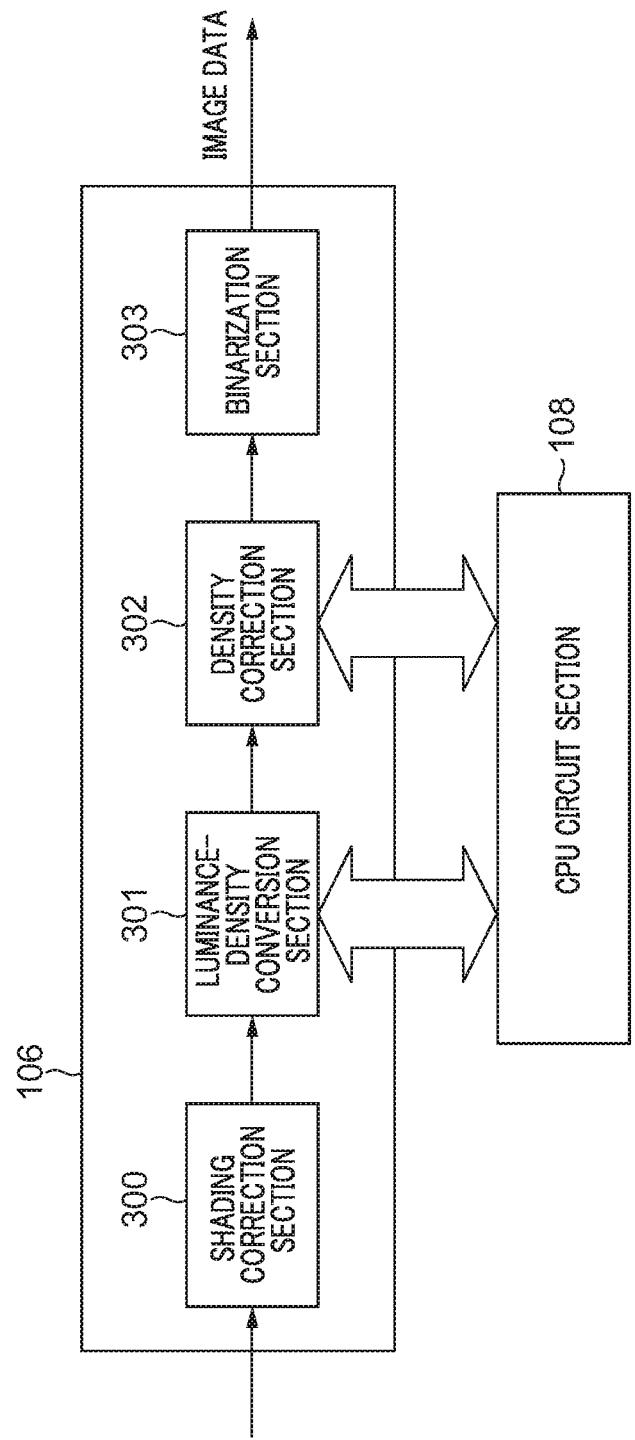
FIG. 3 is a block diagram of an image processor.

FIG. 3 is a block diagram of the image processor 106. In the image processor 106, a digital image signal (image data) output from the analog signal processor 105 is input to a shading correction section 300. The shading correction section 300 corrects variations in a sensor that reads the original 100 and light distribution characteristics of an original illuminating lamp. The corrected image data is input to a luminance-density conversion section 301. The luminance-density conversion section 301 converts the image data output from the shading correction section 300 from luminance data to density data by logarithmic conversion. In general, in the luminance-density conversion, a logarithmic table is created using a conversion formula. Logarithmic conversion in a case where both of input and output data items are composed of 8 bits is performed by the following equation (1):

$$\text{Out} = \{-255/D \max\} \times \log(\text{In}/255) \tag{1}$$

(In: luminance data; Out: density data; Dmax: maximum density)

In the above equation (1), the maximum density Dmax represents a value determined based on a result of reading the test original PG. The equation (1) is for converting the luminance data In such that the density data value Out becomes equal to 255 assuming that the density of an original is the maximum density Dmax (Dmax represents a numerical value). Therefore, it means that in a case where the density data value Out becomes larger than 255, the density data value Out is limited to 255. By changing the maximum density Dmax according to the result of reading the test original PG, it is possible to reduce the saturation of the density value at the end of density data acquired by logarithmic conversion, whereby it is possible to generate a more suited density correction table. The equation used for converting the luminance data to the density data is not limited to the equation (1), but the equation (1) may be replaced by a conversion equation or conversion table other than the above. The image data having been subjected to the luminance-density conversion is input to a density correction section 302.

Figure 9:
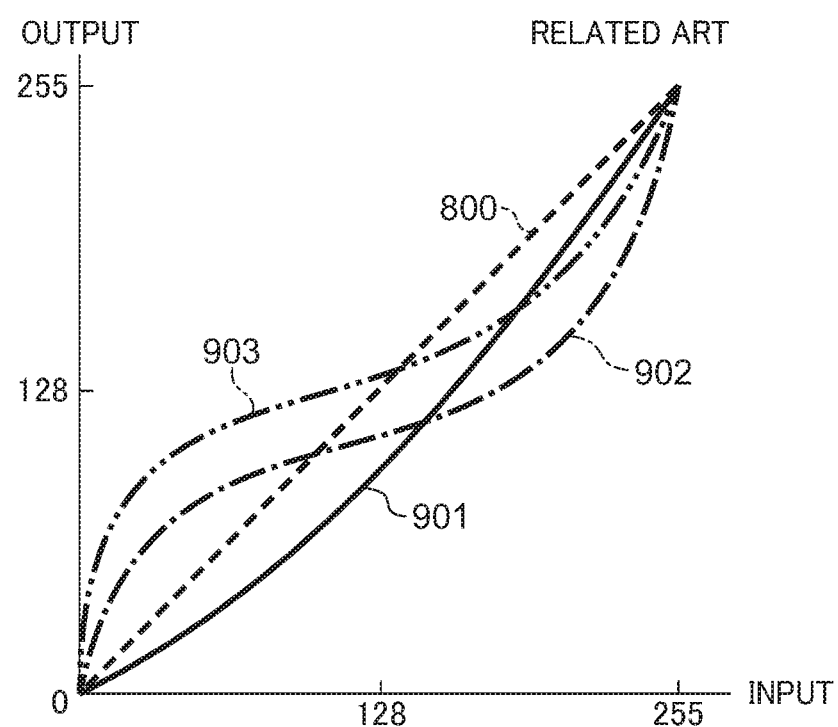
FIG. 9 is a diagram showing an example of a density correction table.

The density correction section 302 performs a process for correcting the density characteristics of the density data obtained by the luminance-density conversion (hereinafter referred to as the density correction process). A density correction table shown in FIG. 9 is set in the density correction section 302. The CPU circuit section 108 performs the density correction table generation process to thereby generate the density correction table according to the settings of the operation section 112 and then sets the same in the density correction section 302. The density correction process is executed using the density correction table. Data of the density correction table is in the form of 8 bits for input and 8 bits for output, for example. Specific values of the density correction table are stored as data values corresponding to the curves 901, 902, and 903 appearing in FIG. 9.

The data values in the density correction table are stored for each condition. In the present embodiment, two density correction tables for 600 dpi and 1200 dpi which are resolutions for copy are stored. Note that the number of resolutions with which copy can be performed may be one or more than two. A binarization section 303 binarizes image data subjected to the density correction process, whereafter the image data is output from the image processor 106 and is input to the printer section 107.

Figure 4:
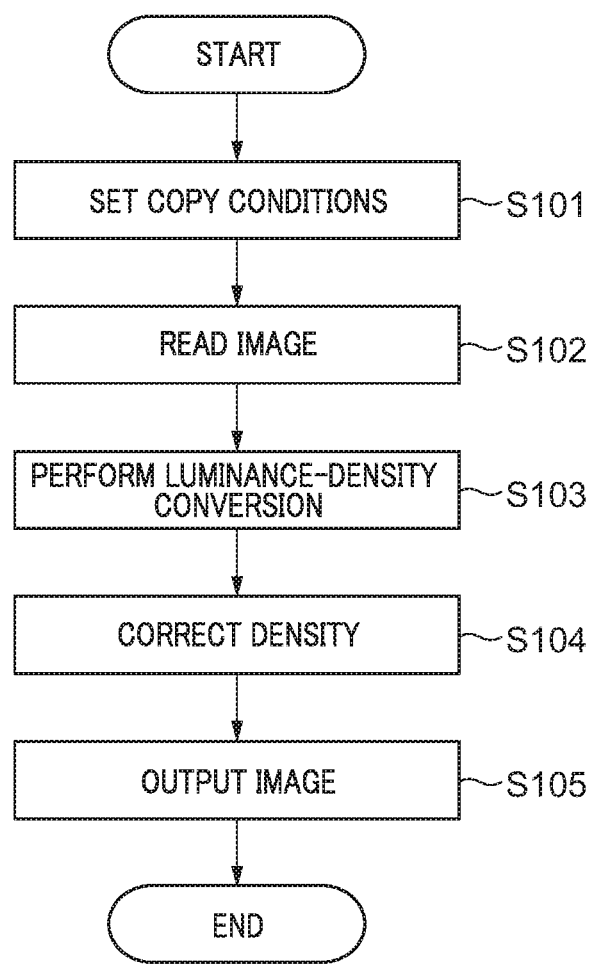
FIG. 4 is a flowchart of a normal copy process.

FIG. 4 is a flowchart of a normal copy process. The flow of the process performed in performing normal copy will be described with reference to FIG. 4. This process is realized by the CPU 109 that loads the associated program stored in the ROM 110 into the RAM 111 and executes the loaded program. This process is started e.g. when an instruction for the normal copy process is input.

First, in a step S101, the CPU 109 receives an instruction on copy conditions given by the user via a touch panel of the operation section 112, and sets the instructed copy conditions according to the received instruction. In the description of the present process, it is assumed that a resolution of 600 dpi is set as one of the copy conditions, by way of example. In a step S102, the CPU 109 causes the image reading section 102 to read the original 100 to thereby generate luminance data. In a step S103, the CPU 109 causes the image processor 106 to perform processing including the shading correction, and causes the luminance-density conversion section 301 to execute processing for converting the luminance data to density data by the equation (1).

In a step S104, the CPU 109 causes the density correction section 302 to perform density correction on the converted density data using a density correction table (e.g. as shown in FIG. 9) which is associated with the set resolution (600 dpi in the present example). The values of the density correction table are acquired based on the density characteristics of the printer section 107. In a step S105, the CPU 109 causes the binarization section 303 to binarize the image data having been subjected to the density correction, and then transmits the image data to the printer section 107 to cause the same to print output the image data on a sheet.

Figure 5A:
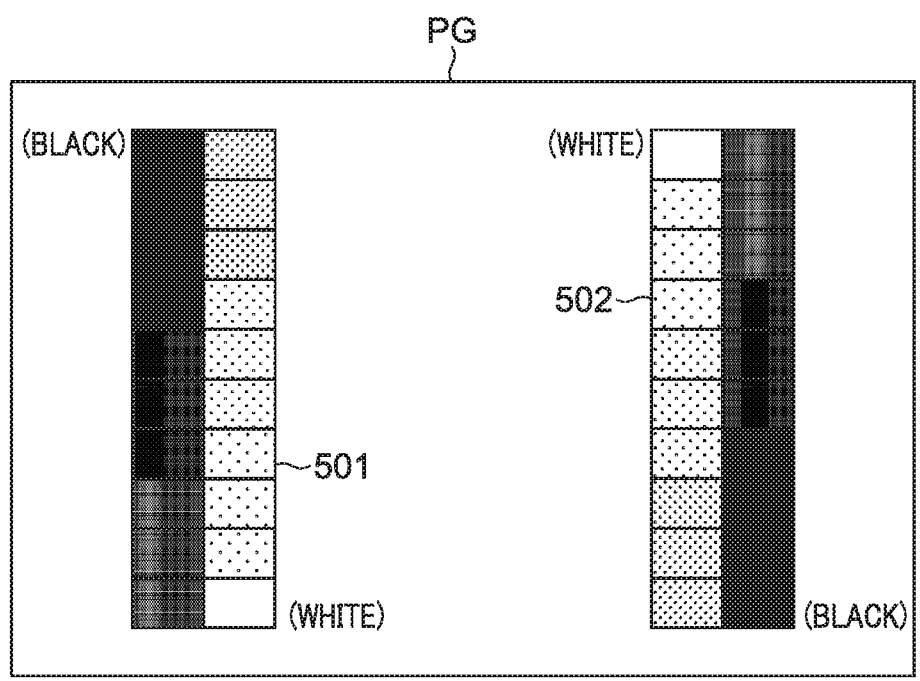
FIG. 5A is a diagram showing an example of a test original.

Next, a density gradation pattern to be printed on the test original PG for generating the density correction table will be described with reference to FIGS. 5A and 5B. FIG. 5A is a diagram showing an example of the test original PG. A pattern 501 and a pattern 502, which are identical in gradation pattern, are printed on the test original PG. Similar to the test original disclosed in US Patent Application Publication No. 2001/026372, in the test original PG, the pattern 501 and the pattern 502 are arranged point-symmetrically with respect to the center position of the output image.

Figure 5B:
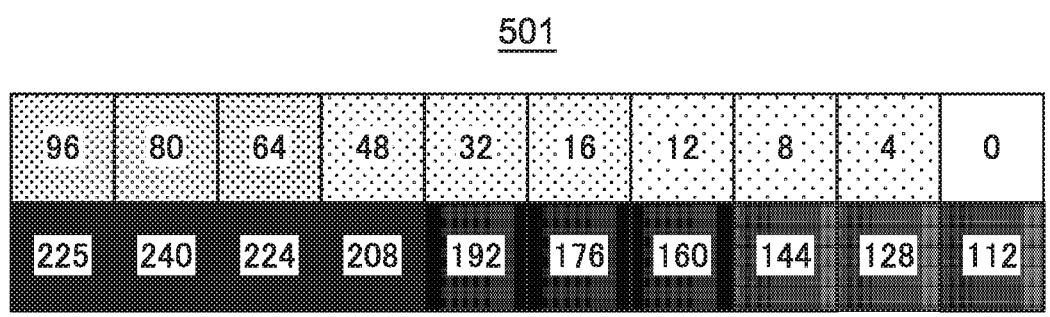
FIG. 5B is an enlarged view of a portion of a pattern shown in FIG. 5A.

FIG. 5B is an enlarged view of the pattern 501. FIG. 5B shows specific data values (20 gradations) of the gradation pattern of the pattern 501. As shown in FIG. 5B, the output data values of the gradation pattern are 0, 4, 8, 12, 16, 32, 48, 64, 80, 96, 112, 128, 144, 160, 176, 192, 208, 224, 240, and 255, starting from the lightest in density. Note that although in the present embodiment, the number of the data values (gradations) of the gradation pattern is 20, the number is not required to be 20. As the number of gradations is larger, it is possible to more accurately grasp the density characteristics of the printer section 107. Note that it is assumed that there is no limitation imposed by error diffusion, dither, or the like, for image formation. Although the size of an original on which the patterns 501 and 502 are formed is assumed to be the A4 size, any size other than the A4 size may be used. Further, the number of patterns included in the test original PG is not limited to two.

Figure 6:
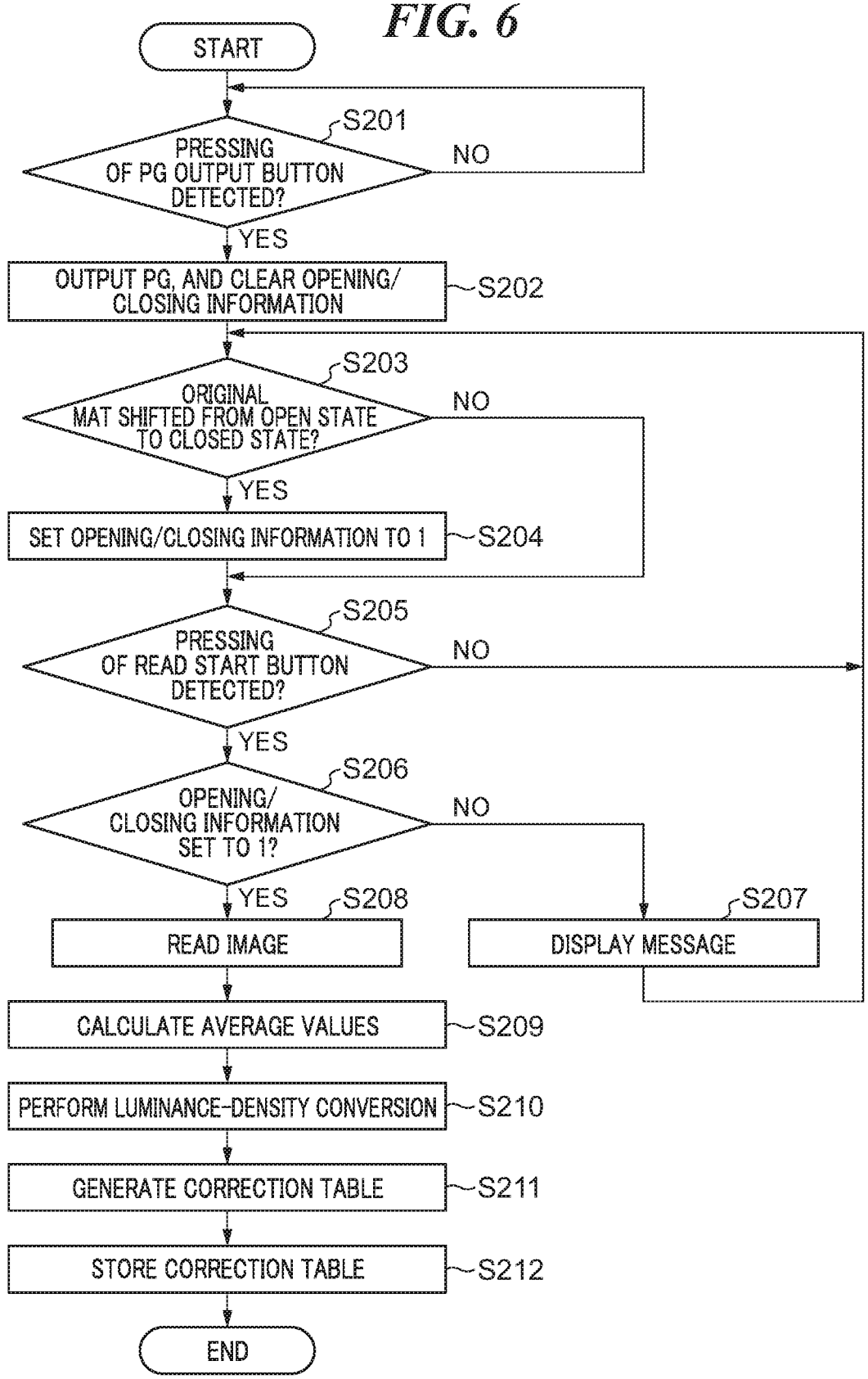
FIG. 6 is a flowchart of a density correction table generation process.

Next, the density correction table generation process and a sequence of notifications in the case of a user's erroneous operation will be described with reference to FIGS. 6 and 7A to 7C. FIG. 6 is a flowchart of the density correction table generation process. This process is realized by the CPU 109 that loads the associated program stored in the ROM 110 into the RAM 111 and executes the loaded program. The process is started e.g. when an instruction for generating a density correction table is input.

In the density correction table generation process shown in FIG. 6, the CPU 109 functions as a controller in the present invention.

Figure 7A:
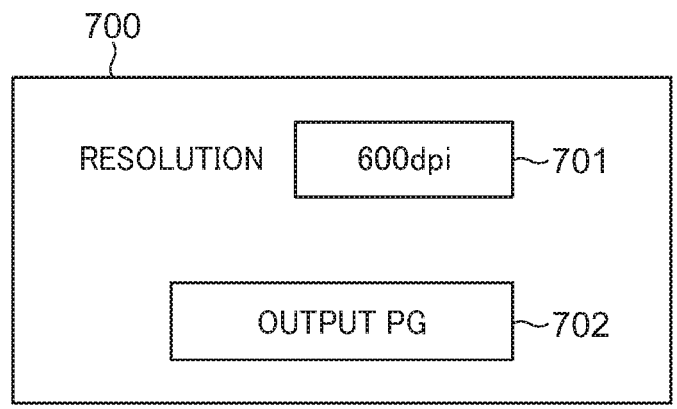
FIGS. 7A to 7C are diagrams of examples of UI screens displayed on a touch panel of an operation section, respectively.
Figure 7B:
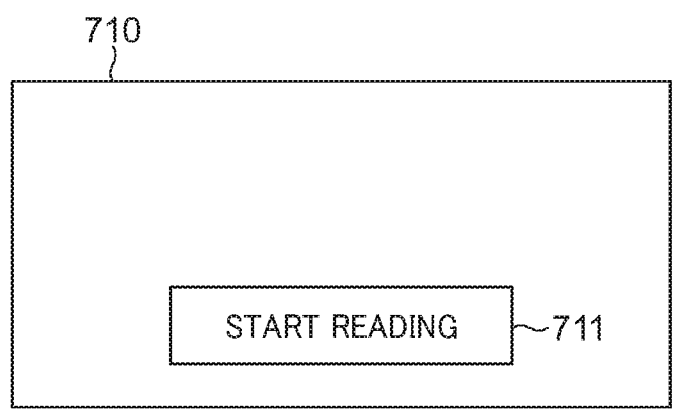
Figure 7C:
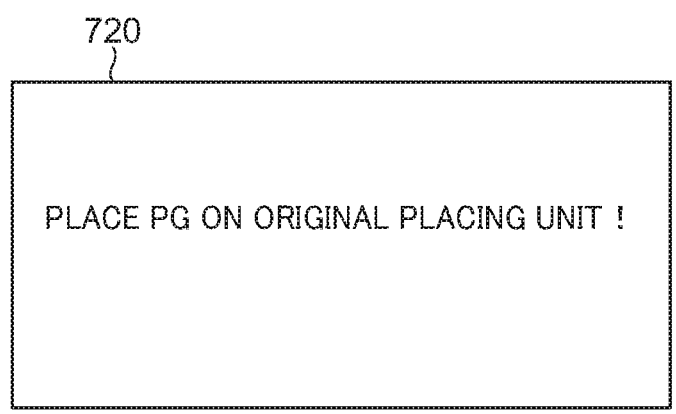
Figure 8:
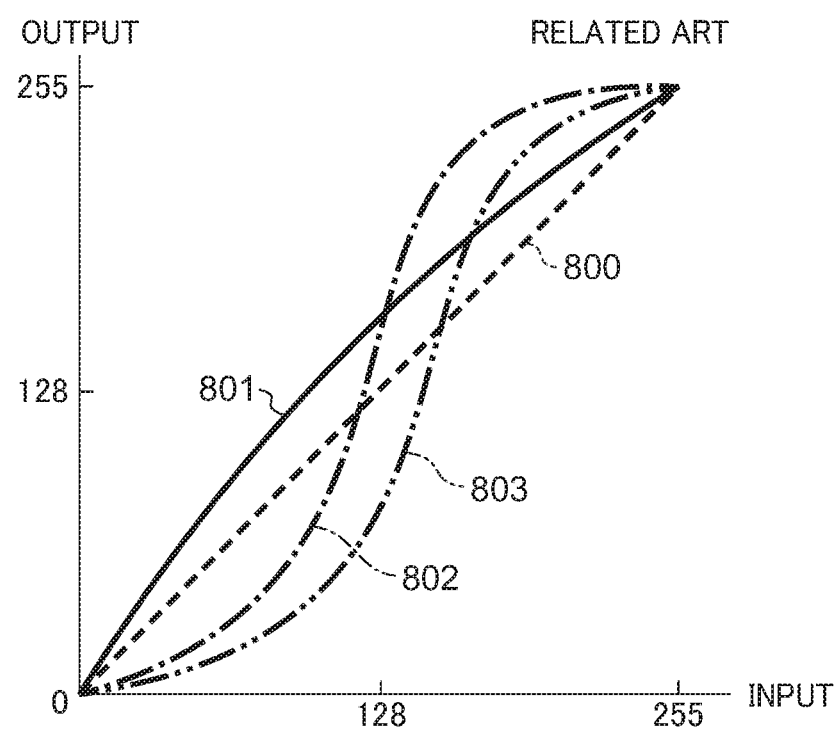
FIG. 8 is a view of density characteristics of an output unit.

FIG. 7A to 7C show examples of UI (User Interface) screens displayed on the touch panel of the operation section 112. On a screen 700 shown in FIG. 7A, there are displayed a resolution input section 701 for designating a resolution and a PG output button 702 for instructing the output of a test original PG. The user can designate a resolution as one of the copy conditions by using the resolution input section 701. When the PG output button 702 is pressed, the screen 700 shifts to a screen 710 shown in FIG. 7B. A read start button 711 is displayed on the screen 710. By pressing the read start button 711, the user can instruct to start the execution of a series of processings for reading the test original PG and generating a density correction table based on image data generated by the reading. The read start button 711 inputs user instruction information for instructing the reading of the original by the reading sensor, in the present invention. FIG. 7C shows an example of a screen 720 for notifying the user that the user has made an erroneous operation.

First, in a step S201 in FIG. 6, the CPU 109 waits until the pressing of the PG output button 702 is detected on the screen 700 shown in FIG. 7A. Upon detection of the pressing of the PG output button 702, the CPU 109 proceeds to a step S202. In the step S202, the CPU 109 performs processing for outputting the test original PG and processing for clearing opening/closing information OC (resetting the opening/closing information OC to 0). The opening/closing information OC is information for indicating that the opening/closing sensor 202 has shifted from an open state to a closed state and is stored in the RAM 111. When the opening/closing information OC is 0, this indicates that the opening/closing sensor 202 has not shifted from the open state to the closed state. When the opening/closing information OC is 1, this indicates that the opening/closing sensor 202 has shifted from the open state to the closed state. In the step S202, more specifically, first, the CPU 109 reads copy conditions for generating the density correction table. The copy conditions include resolution information of a resolution of 600 dpi, which is input via the touch panel of the operation section 112. Then, the CPU 109 reads out data of the density gradation pattern to be printed on the test original PG from the ROM 110, and causes the printer section 107 to print the density gradation pattern on the original 100, to thereby output the test original PG. Then, the CPU 109 clears the opening/closing information OC.

Next, in a step S203, the CPU 109 determines whether or not the opening/closing sensor 202 has shifted from the open state to the closed state. For example, in a case where a state of the ON signal being not output from the opening/closing sensor 202 is changed to a state of the ON signal being output from the opening/closing sensor 202, it is determined that the opening/closing sensor 202 has shifted from the open state to the closed state. If it is determined in the step S203 that the opening/closing sensor 202 has shifted from the open state to the closed state, the CPU 109 sets the opening/closing information OC to 1 in a step S204 and then proceeds to a step S205. On the other hand, if the opening/closing sensor 202 has not shifted from the open state to the closed state, the CPU 109 directly proceeds to the step S205.

In the step S205, the CPU 109 determines whether or not the pressing of the read start button 711 on the screen 700 (FIG. 7B) has been detected. If it is determined in the step S205 that the pressing of the read start button 711 has not been detected, the CPU 109 returns the process to the step S203. On the other hand, if the pressing of the read start button 711 has been detected, the CPU 109 proceeds to a step S206, wherein the CPU 109 reads out the opening/closing information OC from the RAM 111 and determines whether or not the opening/closing information OC is 1. It can be said, in other words, that the determination in the step S206 is determination as to whether or not, after the test original PG has been output at the step S202 and before the read start button 711 is pressed, an operation of closing the original mat 201 is executed to set the opening/closing condition to 1.

If it is determined in the step S206 that the opening/closing information OC is 1, it is presumed that after the test original PG has been output, the original mat 201 has been opened and further closed. Therefore, it is presumed that the user has performed proper actions of placing the test original PG discharged onto the discharge tray 114 on the original placing unit 101 and further closing the original mat 201. For this reason, the CPU 109 determines that it is possible to perform the above-described series of processings for reading the test original PG and generating a density correction table, and hence proceeds to a step S208 to start the execution of the series of processings.

However, if the opening/closing information OC is 0, it is presumed that the original mat 201 remains closed after the test original PG has been output or alternatively the original mat 201 remains unclosed after being once opened. Therefore, there is a possibility that the user has forgotten to place the test original PG discharged onto the discharge tray 114 on the original placing unit 101. In view of this, the CPU 109 determines that it is impossible to perform the above-described series of processings and proceeds to a step S207.

In the step S207, the CPU 109 causes a message shown in FIG. 7C to be displayed on the touch panel of the operation section 112. This message is e.g. for notifying the user that the user has forgotten to place the test original PG and prompting the user to place the test original PG on the original placing unit 101 (for example "Please place PG on original placing unit"). Note that the notification to the effect that it is impossible to perform the series of processings is not limited to one by the method using a message, as shown in FIG. 7C, but, for example, it may be executed by a method using sound. After the step S207, the CPU 109 returns to the step S203. Therefore, unless the opening/closing information OC is set to 1, the series of processings is not performed and no density correction table is generated.

In the step S208, the CPU 109 reads the test original PG using the image reading section 102. Here, image data (read data) obtained by reading an original is normally luminance data proportional to the reflectance of the original. In a step S209, the CPU 109 calculates respective average values of 20 pairs of luminance data values based on results of reading the test original PG, and transmits the calculated 20 average luminance data values to the image processor 106. An equation for calculating an average luminance data value is expressed by the following equation (2):

$$PG\_average[N]=(PG501[N]+PG502[N])/20 \quad (2)$$

(N=1 . . . 20)

In the above equation (2), PG_average [N] represents an average luminance data value, and PG501 and PG502 represent respective names of the patterns 501 and 502 appearing in FIG. 5A. Further, PG501 [N] and PG502 [N] represent read respective luminance data values of 20 gradations of the patterns 501 and 502. N represents a gradation number and a luminance data number. Since 20 gradations are set in the present embodiment, N takes a value in a range of 1 to 20.

Next, in a step S210, the CPU 109 causes the luminance-density conversion section 301 to perform luminance-density conversion on the calculated 20 average luminance data values using the equation (1). 20 average data values obtained by the luminance-density conversion are transmitted to the CPU circuit section 108. In a step S211, the CPU 109 generates a density correction table having 256 data values, from the 20 average data values obtained by the luminance-density conversion. In a step S212, the CPU 109 stores the generated density correction table in the RAM 111 in association with a condition input therefor. In the present embodiment, the density correction table is stored in the RAM 111 in association with the resolution information of the resolution of 600 dpi, which is one of the copy conditions. The generated density correction table is read from the RAM 111 when executing copying and is set in the density correction section 302 of the image processor 106, for use in density correction.

According to the process shown in FIG. 6, even if the user forgets to place the test original PG output this time, it is possible to notify the user of the fact based on information from the opening/closing sensor 202. Therefore, it is possible to prevent a wrong density correction table from being generated based on an improper test original PG.

Note that in a case where after termination of storage of the density correction table, the user desires to continue to generate a density correction table for another resolution, e.g. for a resolution of 1200 dpi, which is one of the copy conditions, it is only required to set the copy condition anew in the step S201 and thereafter perform the same processing.

Note that if the answer to the question of the step S206 is negative (NO), the density correction table generation process shown in FIG. 6 may be terminated without displaying the message. In such a case, neither the series of processings is performed nor the density correction table is generated.

Note that the read start button 711 may be configured such that it is held in a grayed out state (state in which the button 711 is unresponsive to being pressed) until the answer to the question of the step S203 becomes affirmative (YES). If the read start button 711 is thus configured, on condition that the answer to the question of the step S205 is determined to be affirmative (YES), the answer to the question of the step S206 is also determined to be affirmative (YES), and the step S208, et seq., are executed.

According to the present embodiment, it is determined whether or not it is possible to perform the series of processings for reading the test original PG and generating a density correction table, based on whether or not the opening/closing information OC is set to 1 after the test original PG has been output and before the read start button 711 is pressed. After the test original PG has been output and before the read start button 711 is pressed, in a case where the opening/closing information OC is set to 1, it is determined that the series of processing can be performed, whereas in a case where the opening/closing information OC is not set to 1, it is determined that the series of processings cannot be performed. Further, when it is determined that the series of processings can be performed, the series of processings is performed, whereas when it is determined that the series of processings cannot be performed, the series of processings is not performed. Therefore, it is possible to prevent correction data (density correction table) from being generated without placing a proper test original PG.

Further, in the case where it is not determined that the series of processings can be performed, this fact is notified to a user, and hence it is possible to notify the user that the user has forgotten to place the test original PG.

Figure 11A:
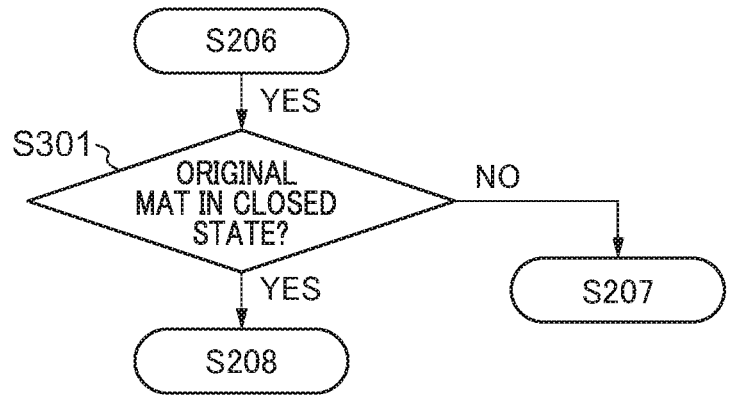
FIGS. 11A to 11C are views each showing a portion of a flowchart of a density correction table generation process as a variation of the density correction table generation process in FIG. 6.
Figure 11B:
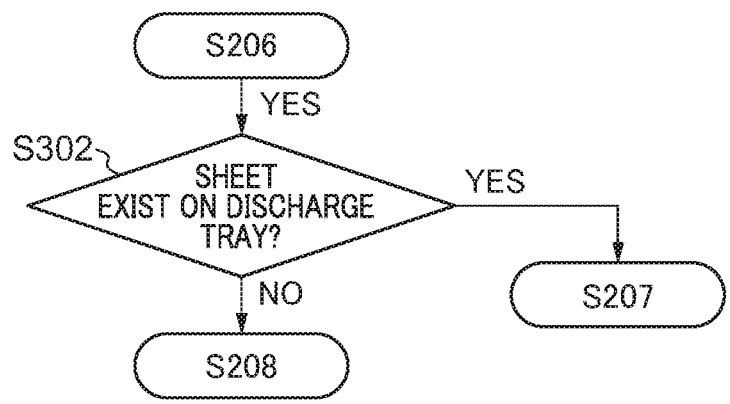
Figure 11C:
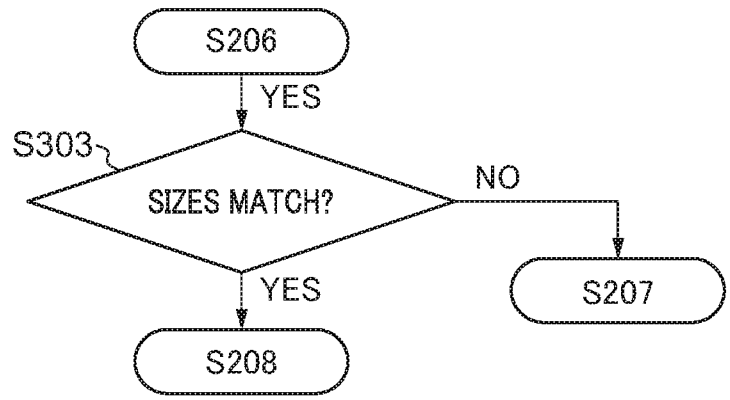

Next, variations of the density correction table generation process shown in FIG. 6 will be described with reference to FIGS. 11A to 11C. FIGS. 11A, 11B and 11C each show a portion of a flowchart of a density correction table generation process as a variation of the process in FIG. 6. In the variations shown in FIGS. 11A, 11B and 11C, if the answer to the question of the step S206 is affirmative (YES), steps S301, S302, and S303 are inserted before the step S208, respectively.

First, in the example illustrated in FIG. 11A, if the answer to the question of the step S206 is affirmative (YES), the CPU 109 determines in the step S301 whether or not the original mat 201 is in the closed state. If the opening/closing sensor 202 has output the ON signal, it is determined that the original mat 201 is currently in the closed state. If it is determined in the step S301 that the original mat 201 is in the closed state, the CPU 109 proceeds to the step S208, whereas if it is determined that the original mat 201 is not in the closed state, the CPU 109 proceeds to the step S207.

Therefore, even in the case where the opening/closing condition is set to 1 after the test original PG has been output and before the read start button 711 is pressed, the CPU 109 does not determine that the above-described series of processings can be performed if the original mat 201 is in the open state. That is, the above-described series of processings is performed on condition that the original mat 201 is closed. Therefore, it is possible to prevent the series of processings from being started with the original mat 201 being open. Note that in this case, a notification for prompting the user to close the original mat 201 may be performed.

In the example illustrated in FIG. 11B, if the answer to the question of the step S206 is affirmative (YES), the CPU 109 determines in the step S302 whether or not there is a sheet on the discharge tray 114, based on the signal from the sheet presence detection sensor 115. If it is determined that there is no sheet on the discharge tray 114, it is estimated that there is a high possibility that the user has moved the test original PG discharged onto the discharge tray 114 to the original placing unit 101. Therefore, the CPU 109 proceeds to the step S208. However, if it is determined that there is a sheet on the discharge tray 114, there is a possibility that the discharged test original PG is not removed from the discharge tray 114. Therefore, the CPU 109 proceeds to the step S207.

Therefore, even in the case where the opening/closing condition is set to 1 after the test original PG has been output and before the read start button 711 is pressed, if there remains a sheet on the discharge tray 114, the CPU 109 does not determine that the above-described series of processings can be performed. This makes it possible to more positively prevent the series of processings from being started in a state in which the output test original PG is not set on the original placing unit 101.

In the example illustrated in FIG. 11C, if the answer to the question of the step S206 is affirmative (YES), the CPU 109 executes the step S303. In the step S303, the CPU 109 determines whether or not the size, detected by the size sensor 113, of the original 100 set on the original placing unit 101 and the size of the test original PG match each other. The size of the test original PG is acquired, in the step S202, by the CPU 109 as one of the copy conditions for generating a density correction table, which is input via the touch panel of the operation section 112. If the two sizes match each other, it is possible to presume that a proper test original PG is set on the original placing unit 101, and hence the CPU 109 proceeds to the step S208. However, if the two sizes do not match each other, it is possible to presume that a proper test original PG is not set on the original placing unit 101, and hence the CPU 109 proceeds to the step S207. For example, it is possible to assume a state in which the immediately preceding output test original PG, which was output according to different conditions, remains set on the original placing unit 101.

Therefore, even in the case where the opening/closing condition is set to 1 after the test original PG has been output and before the read start button 711 is pressed, if the two sizes do not match each other, the CPU 109 does not determine that the above-described series of processings can be performed. This makes it possible to more positively prevent the series of processings from being started in a state in which a proper test original PG output this time is not set on the original placing unit 101.

Note that the variations shown in FIGS. 11A, 11B and 11C may be applied by being properly combined with each other insofar as there is no contradiction therebetween. That is, if the answer to the question of the step S206 is affirmative (YES), at least one of the steps S301, S302, and S303 may be inserted before the step S208.

Note that the image forming apparatus to which the present invention is applied is only required to be an apparatus in which output image density variation occurs. Therefore, the present invention can be applied not only to an apparatus using the electrophotographic method but also to apparatuses using an inkjet recording method, a thermal transfer method, and other various methods.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-080252, filed Apr. 19, 2019, which is hereby incorporated by reference herein in its entirety.

What is claimed is:
1. An image forming apparatus comprising:
a platen on which an original is placed;
a pressure plate for pressing the original on the platen against the platen, the pressure plate being capable of being opened and closed with respect to the platen;
a reading sensor configured to read the original placed on the platen;
an operation panel to which is input user instruction information for instructing the reading of the original by the reading sensor, the operation panel including a display;
a pressure plate sensor configured to detect a first state in which the pressure plate is closed and a second state in which the pressure plate is not closed;
an image processor configured to perform correction processing on image data based on a correction condition;
an image forming unit configured to form an image based on the image data on which the correction processing has been performed; and
a controller configured to:
control the image forming unit so as to form a pattern on a sheet;

control the reading sensor based on the user instruction information, so as to acquire read data concerning the pattern; and generate the correction condition based on the read data, wherein in a case where the user instruction information is input, unless a detection result of the pressure plate sensor is changed from the second state to the first state after the pattern has been formed on the sheet, the controller controls the display so as to display a screen for prompting a user to place the sheet having the pattern formed thereon.

2. The image forming apparatus according to claim 1, wherein in the case where the user instruction information is input, if the detection result of the pressure plate sensor is changed from the second state to the first state after the pattern has been formed on the sheet, the controller does not cause the display to display the screen.

3. The image forming apparatus according to claim 1, wherein in the case where the user instruction information is input, even if the detection result of the pressure plate sensor is changed from the second state to the first state after the pattern has been formed on the sheet, if a current detection result of the pressure plate sensor is the second state, the controller controls the display so as to display the screen.

4. The image forming apparatus according to claim 1, further comprising a size sensor for detecting a size of a sheet on the platen, and wherein if the size detected by the size sensor is different from a size of the sheet having the pattern formed thereon, the controller controls the display so as to display the screen.

5. The image forming apparatus according to claim 1, further comprising:

a tray on which the sheet having the pattern formed thereon is discharged; and a sheet sensor that detects a sheet on the tray, wherein in a case where the sheet on the tray is detected by the sheet sensor, the controller controls the display so as to display the screen.

* * * * *